(12) United States Patent
Nanjo et al.

(10) Patent No.: US 6,633,731 B2
(45) Date of Patent: Oct. 14, 2003

(54) ELECTRONIC VIEW FINDER APPARATUS

(75) Inventors: Yusuke Nanjo, Kanagawa (JP); Toshiaki Isogawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/883,234

(22) Filed: Jun. 19, 2001

(65) Prior Publication Data

US 2002/0039491 A1 Apr. 4, 2002

(30) Foreign Application Priority Data

Jun. 20, 2000 (JP) ..................... P2000-185047

(51) Int. Cl.[7] ............... G03B 17/20; G03B 13/02; H04N 5/222
(52) U.S. Cl. .............. 396/296; 396/374; 348/333.01
(58) Field of Search ............... 396/374, 373, 396/378, 84, 141, 148, 271, 296; 348/341, 333.01, 333.09, 766, 767; 349/33, 76

(56) References Cited

U.S. PATENT DOCUMENTS 5,489,965 A * 2/1996 Mukai et al. ............... 396/374
5,749,008 A * 5/1998 Ishihara et al. ............. 396/373

* cited by examiner

*Primary Examiner*—Russell Adams
*Assistant Examiner*—Rochelle Blackman
(74) *Attorney, Agent, or Firm*—Rader, Fishman & Grauer PLLC; Ronald P. Kananen, Esq.

(57) ABSTRACT

Provided is an electronic view finder for use in a video camera apparatus that by making the relative position between an LCD and an ocular lens unit proper can decrease the rotatory polarization characteristic and can thereby enhance the contrast of the image. When a liquid crystal image screen surface has the characteristic of Viewing-Angle that this screen surface is seen with its contrast or brightness being different according to the direction in which to see the screen surface, the center of an eye-cup opening portion (6) on the light emission side of an ocular lens unit (2) is shifted from an optical axis (3) of the ocular lens unit (2). Thereby, an observer's eye is guided to a position detached from the position corresponding to the optical axis (3) to see the liquid crystal image screen surface (1) from an oblique direction. It has been thereby arranged to enable the liquid crystal image screen surface to be observed with an excellent contrast.

5 Claims, 6 Drawing Sheets

ELECTRONIC VIEW FINDER APPARATUS

BACKGROUND OF THE INVENTION

1. Field of the Invention

The present invention relates to an electronic view finder apparatus that is suitably used in, for example, a video camera apparatus. More particularly, the invention concerns an electronic view finder apparatus adapted to observe a video display apparatus, such as an LCD, having the characteristic of Viewing-Angle by magnifying it with the use of an ocular lens unit, which can enhance the contrast of the image depending upon the characteristic of Viewing-Angle by making proper the relative disposition between the video display apparatus and the ocular lens unit.

2. Description of the Prior Art

Conventionally, in an electronic view finder for use in a video camera apparatus, a small-sized CRT (cathode ray tube), LCD, etc. is mainly used as the video display apparatus; and, it is arranged so that the image of the video display apparatus is observed by being magnified through the use of an ocular lens unit. However, because the CRT has a long size in the depth direction, as measured from the image screen surface, it is unsuitable for being used in a small-sized video camera apparatus. Also, the LCD is small in size and light in weight, and, in addition, the number of pixels thereof has in recent years been remarkably enhanced. Therefore, it also becomes sufficiently practical to perform focusing with respect to the image of the finder, so that the LCD has been widely diffused over a high grade of apparatus as well.

By the way, in the video display apparatus using a CRT, even when the image screen surface is looked at from an oblique direction with the direction in which to observe it being more or less shifted from the front, brightness or contrast of the image does not change sensitively. However, in case of an LCD, when looking at the image screen surface from an oblique direction, the brightness or contrast sensitively changes. In addition, when having observed the image screen surface from the front, the best contrast is not always obtained. There is also a case where the contrast becomes the best when observing the image screen surface from a direction that is oblique by a prescribed degree of angle with respect to a prescribed azimuth angle. This characteristic in which the brightness or contrast depends upon the direction in which to observe is referred to as "the characteristic of Viewing-Angle".

While there are some kinds of liquid crystals for use in an LCD, the liquid crystal that is most widely used is TN (Twisted Nematic) type liquid crystal. The present invention also concerns an electronic view finder apparatus that uses therein an LCD that uses TN type liquid crystal.

Here, an explanation will be given of the operational principle that the characteristic of Viewing-Angle of the TN type liquid crystal is not symmetrical and, when this liquid crystal is looked at from a prescribed direction and at a prescribed angle, it has the best contrast.

FIG. 4 illustrates the arrangement of the liquid crystal molecules when no voltage is applied to the TN type liquid crystal.

Between two sheets of polarizing plates 10, 11, whose polarization directions intersect each other at a right angle, liquid crystal cells 12 and 13 are clamped in a way so as to be sandwiched therebetween. Regarding the liquid crystal cells 12 and 13, the liquid crystal molecules 14 thereof on one liquid crystal cell 12 side are parallel with the polarizing plate 10 on the light incidence side. On the other hand, on the other liquid crystal cell 13 side, they are twisted through an angle of 90° and, in this state, they become parallel with the polarizing plate 11 on the light emission side. Accordingly, the back light that has entered the liquid crystal from the polarizing plate 10 side on the light incidence side is linearly polarized by the polarizing plate 10. Thereby, as in the case of the liquid crystal molecules 14, the back light is twisted (rotated) by 90° and goes out of the polarizing plate 11. Namely, the LCD looks white.

FIG. 5 illustrates the arrangement of the liquid crystal molecules when a voltage has been applied across transparent electrodes (not illustrated) between the liquid crystal cells 12 and 13.

According to this arrangement, the liquid crystal molecules 14 become vertical with respect to the liquid crystal cells 12 and 13 along the electric field that has been applied as above. As a result of this, the rotatory action does not occur. Accordingly, the back light that has entered from the polarizing plate 10 side on the light incidence side is interrupted by the polarizing plate 11 on the light emission side. Resultantly, the LCD looks black.

By the way, speaking strictly, the liquid crystal molecules 14 illustrated in FIG. 5 have only their liquid crystal molecules alone that are in contact with the liquid crystal cells 12 and 13 influenced by the inter-molecular attractive force between themselves and high-molecular thin film surfaces coated on the surfaces of the liquid crystal cells. For this reason, those liquid crystal molecules, owing to this influence, don't completely become vertical with respect to the liquid crystal cells 12 and 13 but become slightly rotated. Namely, the LCD doesn't completely look black.

FIG. 6 illustrates the relationship between the voltage (V) applied across the liquid crystal cells and the transmittance (T). This graphic diagram is an example of the V-T characteristic ($\theta=0°$) as measured in the vertical direction of the LCD. As apparent from this graphic diagram, applying a high voltage to the liquid crystal cells results in the transmittance becoming zero. However, for the reason that the liquid crystal molecules become slightly rotated, as stated above, that transmittance doesn't completely become zero. Also, applying a high voltage is not realistic because of the problems with the withstanding voltage of a device constituting the drive circuit, the unnecessary increase in the voltage consumption, etc. Accordingly, in general, the black signal voltage level of the LCD is set to 4 volts.

Also, the white signal voltage of the LCD is set to 1.5 volts, whereby through applying a signal voltage of 4 to 1.5 volts, colors from black to gray to white are displayed.

Here, the degree of excellence of the contrast of the brightness of the LCD is quantitatively defined in terms of the contrast ratio between the transmittance at the time of applying a white signal voltage and the transmittance at the time of applying a black signal voltage. Namely, because the transmittance corresponding to 4 volts is 2%, the contrast ratio in this case is 100/2=50.

FIG. 7 illustrates the V-T characteristic with regard to the oblique direction in addition to the V-T characteristic ($\theta=0°$) with regard to the vertical direction of the LCD of FIG. 6. Namely, as stated previously, even when a high voltage is applied, the liquid crystal molecules that are in contact with the liquid crystal cells are not completely vertical with respect to the liquid crystal cells. Namely, they are more or less inclined and thereby have a certain low level of rotatability. When the LCD is looked at from that inclined direction, that low level of rotatability is relatively mitigated. As a result, even when applying the same black signal voltage, the LCD looks black.

For example, the V-T characteristic (θ=10°) is such that when the black signal voltage is 4 bolts, the transmittance is approximately 0.1%. Therefore, the contrast ratio becomes 100/0.1=1000. The contrast ratio, therefore, is greatly improved. Conversely, when the LCD is looked at from a side of promoting the rotatory polarization, the V-T characteristic (θ=−10°) is such that when the black signal voltage is 4 volts, the transmittance is approximately 10%. Therefore, the contrast ratio becomes 100/10=10, which indicates that the contrast ratio becomes greatly deteriorated.

SUMMARY OF THE INVENTION

The present invention has been made in order to solve the above-described problems and has an object to provide an electronic view finder apparatus that by making proper the relative position between the LCD and the ocular lens can mitigate the rotatory polarization and can thereby improve the contrast of the image.

To attain the above object, the present invention provides an electronic view finder apparatus arranged such that the liquid crystal image screen surface has the characteristic of Viewing-Angle so that this image screen surface is seen with its contrast or brightness being different according to the direction in which to see the image screen surface; the center of an opening portion on the light emission side of the ocular lens unit is disposed in a way that the center is shifted from an optical axis of the ocular lens unit; an observer's eye is thereby guided to a position detached from the position corresponding to the optical axis; and when the observer resultantly is made to see the liquid crystal image screen surface from an oblique direction, the image screen surface is seen with a higher contrast than when the observer has seen the image screen surface from along the optical axis by satisfying the following conditions:

0.3 h<Δ<1.5 h where, under the assumption that θ represents the angle defined by a direction in which the image is most clearly seen with respect to the optical axis and f represents the focal length of the ocular lens unit when the diopter is set to have a value of 0, the amount h of shift between the optical axis for seeing the image at the angle of θ and the visual line is obtained from the h=f·tan θ; and the Δ represents the actual amount of shift between the optical axis and the visual line.

According to the above-described electronic view finder apparatus, the video display apparatus, in which the contrast becomes low due to the characteristic of Viewing-Angle when being looked at from its front surface, becomes able to be observed with an optimum contrast.

DETAILED DESCRIPTION OF THE PREFERRED EMBODIMENTS

An embodiment of the electronic view finder apparatus according to the present invention will hereafter be explained with reference to the drawings.

Figure 1:
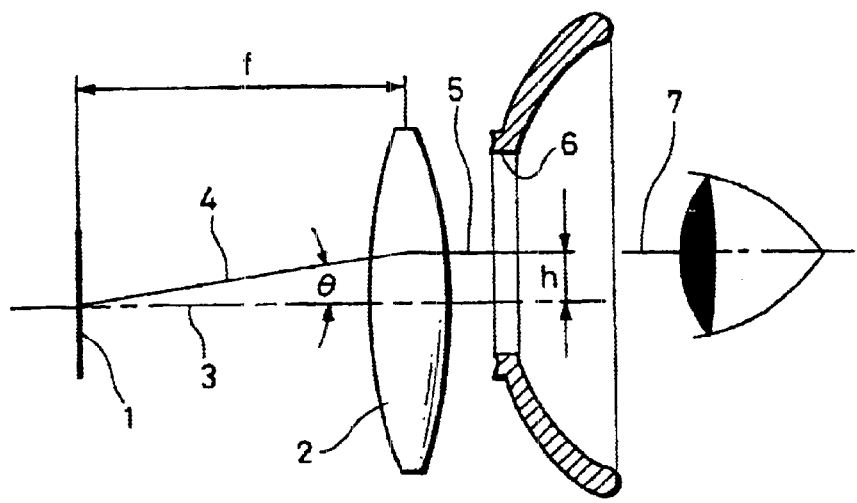
FIG. 1 is a schematic view illustrating the principle of an electronic view finder apparatus according to the present invention.

FIG. 1 is a schematic diagram illustrating the principle of an electronic view finder apparatus. The construction thereof is as follows. An image screen surface 1 of the liquid crystal has a high sensitivity to the characteristic of Viewing-Angle. It is assumed that when having observed the image screen surface 1 at a prescribed azimuth angle of substantially θ with respect to the front surface of the image screen surface 1, the contrast looks the most excellent. Assuming that the light ray that emits from the center of the image screen surface 1 and advances toward the angle θ is represented as a center light ray 4, this center light ray 4 passes through an ocular lens unit 2. Thereafter, that center light ray continues to advance as a light ray 5 substantially parallel with an optical axis 3. Then, that center light ray enters upon an observer's eye.

Under the assumption that the ocular lens unit 2 is composed of small-thickness lenses, the diopter is adjusted to a value of 0, and the distance from the image screen surface 1 to the ocular lens 2 is the focal length f, calculation is performed using a paraxial theory. Then, by setting the distance h between the optical axis 3 and the visual line 7 to be h=f·tan θ, the above-described construction is obtained. Actually, even if the setting is not made to be Δ=h, the amount Δ of shift between the optical axis 3 and the visual line 7 has a range enabling the image screen surface to look substantially excellent. Therefore, it is preferable to set the range of the Δ as stated above. When exceeding the lower limit of the conditional expression, the effect of the present invention is lost with the result that no difference in terms of the excellence is made as compared with when observing the image screen surface from the front surface thereof. Also, when the value of the Δ becomes large, the height of the finder apparatus as a whole becomes great. And, when exceeding the upper limit of that conditional expression, the size becomes large, with the result that the finder apparatus becomes practical. Simultaneously, the degradation of the performance of the ocular lens unit 2 due to the deviation between the optical axis 3 and the visual line 7 becomes remarkable, with the result that the aberration correction becomes difficult to perform. Accordingly, by providing the opening portion 6 of the eye-cup in such a way that the upper part and lower part thereof are symmetrical with respect to the amount Δ of shift from the optical axis 3, the observer naturally becomes able to bring his visual line 7 substantially into coincidence with the light ray 5.

Figure 2:
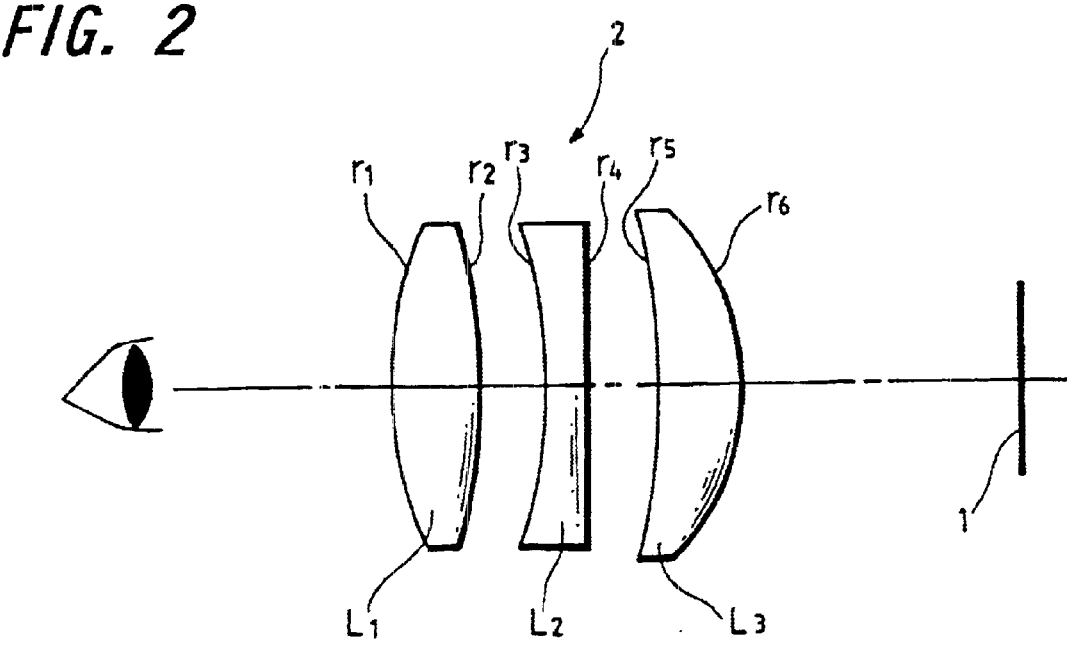
FIG. 2 is a constructional view of an ocular lens unit according to the present invention.

FIG. 2 illustrates an example of the ocular lens unit 2. Here, the ocular lens unit is composed of three sheets of plastic lenses, including a convex lens $L_1$, a concave lens $L_2$, and a convex lens $L_3$ when these lenses are mentioned in sequential order viewed from the observer's side. The total six-lens surfaces of these respective lenses each consist of an aspherical surface. And, the amounts of deviation of the aspherical surfaces from a reference spherical surface have aspherical surface coefficients at which when mentioned in sequential order viewed from the observer's side a first surface $r_1$ becomes directed in a direction of moving away from the image screen surface, a second surface $r_2$ becomes directed in a direction of moving toward the image screen surface, a third surface $r_3$ becomes directed in a direction of moving away from the image screen surface, a fourth surface $r_4$ becomes directed in a direction of moving away from the image screen surface, a fifth surface $r_5$ becomes directed in a direction of moving away from the image screen surface, and a sixth surface $r_6$ becomes directed in a direction of moving away from the image screen surface.

Also, the numerical value examples that are illustrated below show a state where there is constructed an imaging system wherein, conversely to the light ray route that occurs when the finder apparatus acts as a finder, a light ray is made incident upon the finder from the observer to thereby form a real image.

The symbols are common to their relevant numerical value examples and are as follows:

ri: the curvature radius of an (i)th surface;

di: the surface interval at the back of the (i)th surface, ni: the refractive index at a line d of the material quality of the lens Li, and vi: the Abbe number of the material quality of the lens Li.

Definition of the aspherical surface: assuming that xi represents the depth of the aspherical surface and H represents the height as measured from the optical axis, the aspherical surface is expressed in the form of the following equation.

$$xi = H^2/ri\{1+(1-H^2/ri^2)^{1/2}\} + \Sigma AkH^k$$

The (e-3) of the aspherical surface coefficient represents $(\times 10^{-3})$.

Numerical value examples:

$r_1$ 27.892 $d_1$ 5.66 $n_1$ 1.492$v_1$ 57.2
$r_2$ −45.778 $d_2$ 5.03
$r_3$ −29.923 $d_3$ 2.4 $n_2$ 1.492$v_2$ 57.2
$r_4$ 108.108 $d_4$ 4.94
$r_5$ −421.525 $d_5$ 5.88 $n_3$ 1.492$v_3$ 57.2
$r_6$ −17.143

| Aspherical surface: | A4 | A6 | A8 | A10 |
|---|---|---|---|---|
| $r_1$ | −0.7951 e-5 | +0.3539 e-8 | −0.5582 e-10 | −0.3591 e-11 |
| $r_2$ | +0.1608 e-4 | −0.1423 e-6 | +0.5582 e-9 | −0.3876 e-11 |
| $r_3$ | −0.1841 e-4 | +0.3188 e-7 | +0.5581 e-9 | −0.6217 e-12 |
| $r_4$ | −0.6944 e-4 | +0.3416 e-6 | −0.3349 e-10 | +0.3876 e-11 |
| $r_5$ | −0.7957 e-4 | +0.2271 e-7 | +0.5582 e-9 | +0.3876 e-11 |
| $r_6$ | −0.4060 e-5 | +0.3363 e-7 | −0.5076 e-9 | +0.3456 e-11 |

Focal length: 33.73

Here, when performing the diopter, either the three sheets of lenses $L_1$, $L_2$, and $L_3$ are integrally moved toward the image screen surface 1 or the above-described numerical values are brought into a state of −diopter. Even when in this state, only one sheet of lens L1 that is the nearest to the observer's side is moved, correction of the diopter is thereby performed, and an excellent level of performance is obtained.

Figure 3:
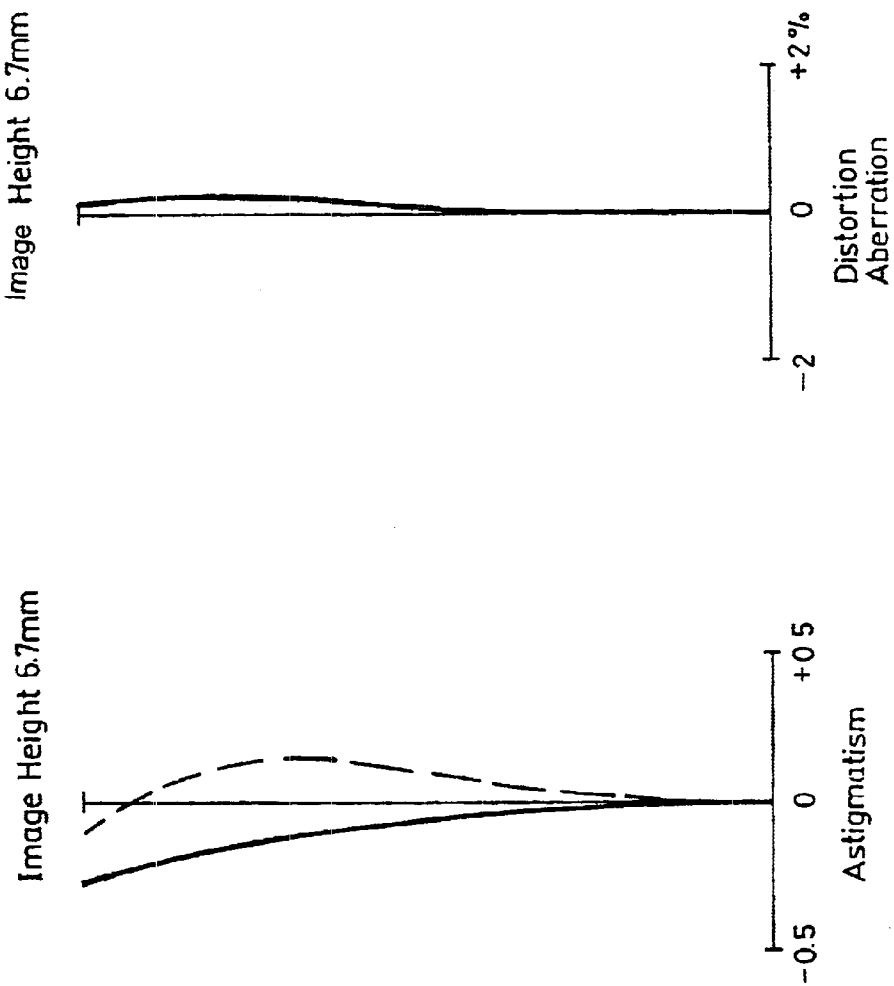
FIG. 3 graphically illustrates the astigmatism and distortion aberration of the ocular lens unit.
Figure 4:
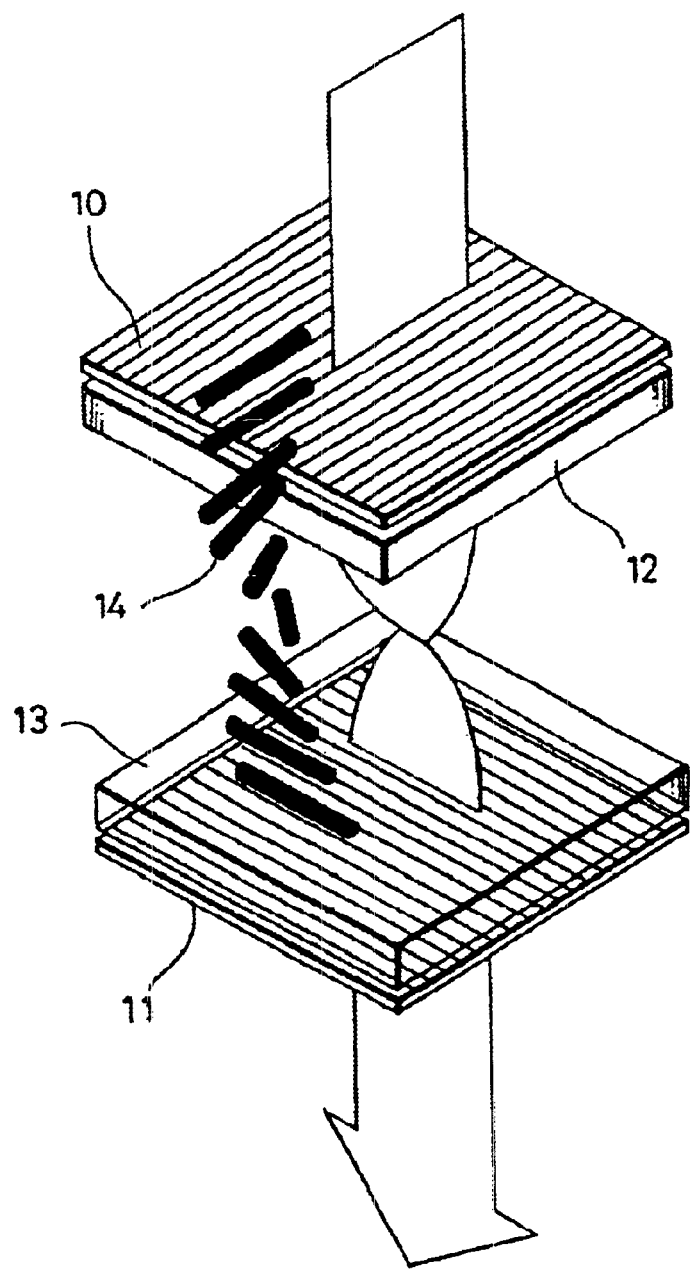
FIG. 4 illustrates the arrangement of the liquid crystal molecules when no voltage is applied to the TN type liquid crystal of the LCD.
Figure 5:
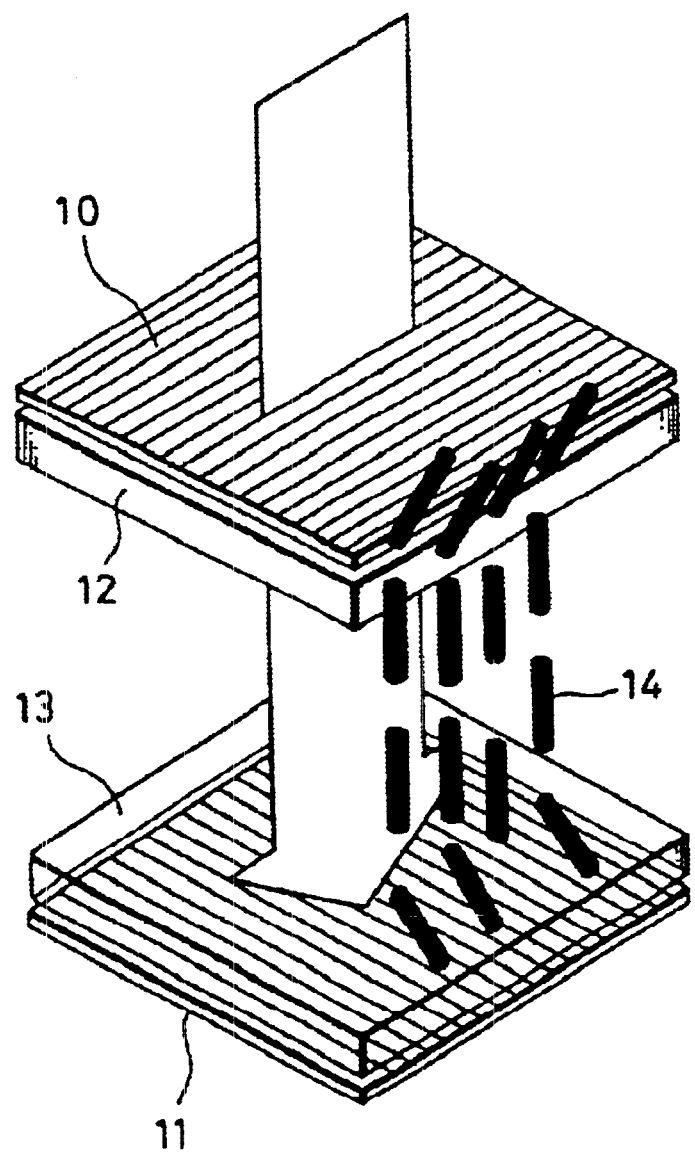
FIG. 5 illustrates the arrangement of the liquid crystal molecules when a voltage has been applied to the TN type liquid crystal of the LCD.
Figure 6:
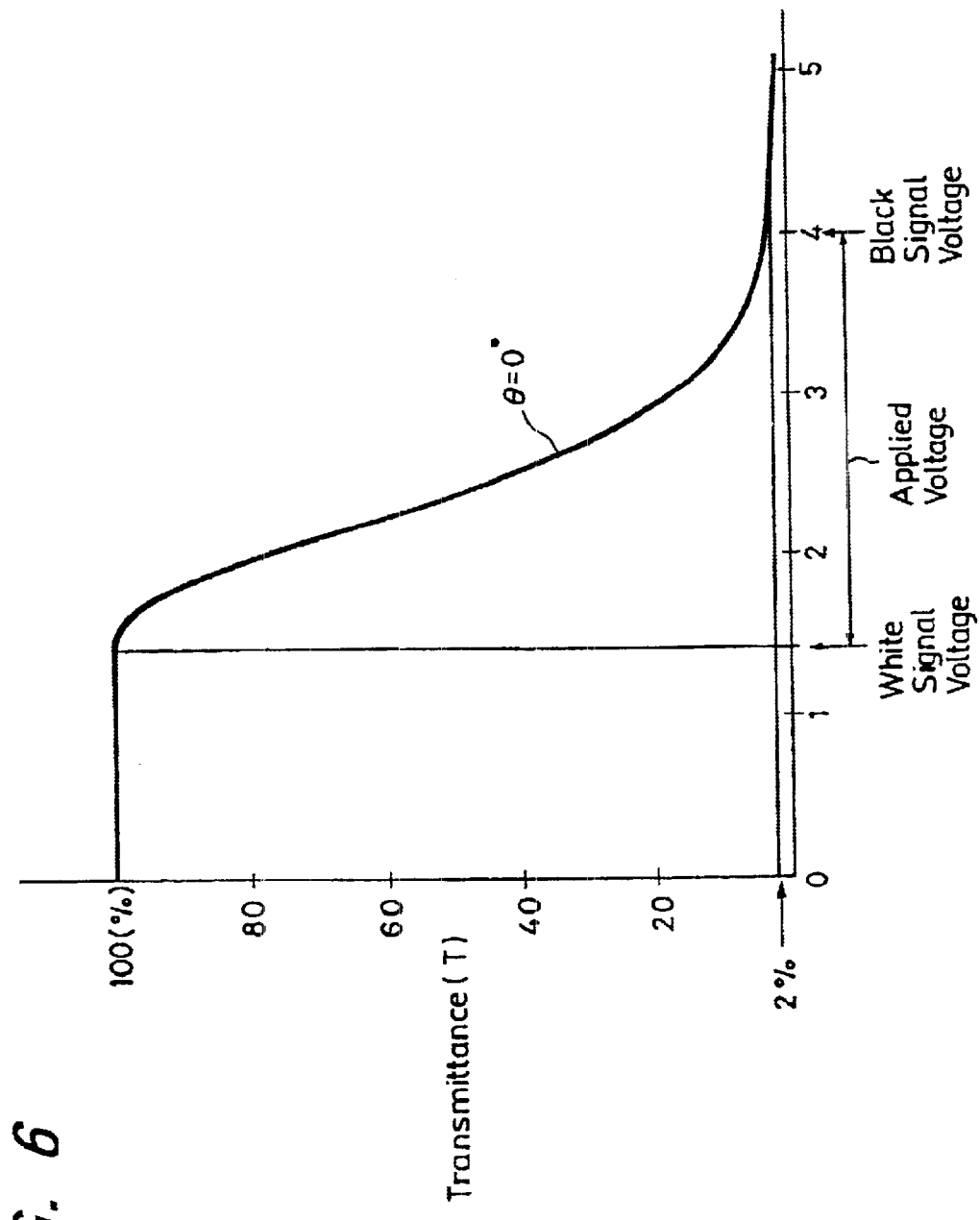
FIG. 6 is a graphic V-T characteristic diagram illustrating the relationship between the voltage applied to the TN type liquid crystal and the transmittance of the LCD.
Figure 7:
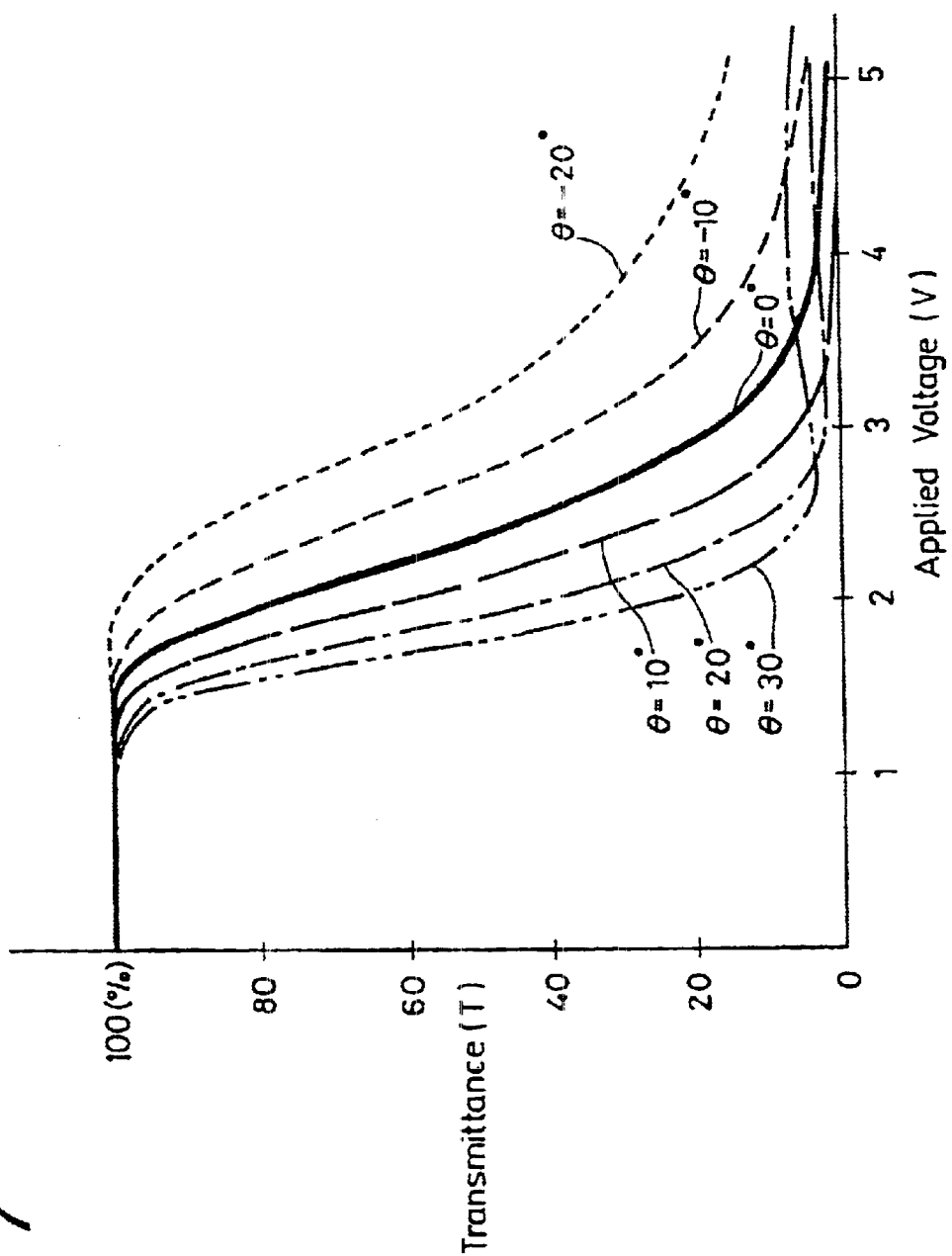
FIG. 7 is a graphic characteristic diagram wherein the V-T characteristics with regard to the oblique directions are superimposed upon the characteristic diagram of FIG. 6.

FIG. 3 illustrates the astigmatism and the distortion aberration in the case of the imaging system with −1 diopter. It is to be noted that in the curve diagram of astigmatism, a solid line indicates a sagital image curved surface and a broken line indicates a meridional image curved surface.

As has been explained above, the electronic view finder according to the present invention is arranged such that the liquid crystal image screen surface has the characteristic of Viewing-Angle, so that this screen surface is seen with its contrast or brightness being different according to the direction in which to see the screen surface; the center of an opening portion on the light emission surface side of the ocular lens unit is disposed in a way that the center is shifted from an optical axis of the ocular lens unit; an observer's eye is thereby guided to a position detached from the position corresponding to the optical axis; and when the observer resultantly is made to see the liquid crystal image screen surface from an oblique direction, the screen surface is seen with a higher contrast. Therefore, the electronic view finder apparatus is very suitably used in a video camera apparatus, etc.

Also, the ocular lens unit is composed of three sheets of plastic lenses, including a convex lens, a concave lens, and a convex lens when these lenses are mentioned in sequential order viewed from the observer's side. The total six-lens surfaces of these respective lenses each consist of an aspherical surface. And, the amounts of deviation of the aspherical surfaces from a reference spherical surface have aspherical surface coefficients at which when mentioned in sequential order viewed from the observer's side a first surface becomes directed in a direction of moving away from the image screen surface, a second surface becomes directed in a direction of moving toward the image screen surface, a third surface becomes directed in a direction of moving away from the image screen surface, a fourth surface becomes directed in a direction of moving away from the image screen surface, a fifth surface becomes directed in a direction of moving away from the image screen surface, and a sixth surface becomes directed in a direction of moving away from the image screen surface. And, when performing the diopter, either the three sheets of lenses are integrally moved toward the image screen surface or only the one sheet of lens that is the nearest to the observer's side can be moved and the remaining two sheets of lenses are fixed to the image screen surface. By doing so, it is possible to easily correct the aberration due to the deviation of the visual line from the optical axis.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An electronic view finder apparatus comprising:

a Twisted Nematic type liquid crystal display;

an ocular lens unit arranged in front of said Twisted Nematic type liquid crystal display; and an eye-cup having an opening portion and provided in front of said ocular lens unit, said eye-cup functioning to guide a human eye to be pressed against said eye-cup, said eye-cup being positioned on the side of the ocular lens unit remote from the liquid crystal display, wherein the center of the opening portion of said eye-cup is shifted from the axis of said ocular lens unit, the amount of shift being designated as h which is, in turn, the shift between said axis and the visual line from the human eye through the eye-cup.

2. The electronic view finder apparatus according to claim 1, wherein when said center of the opening portion of said eye-cup relative to the axis of said ocular lens unit is shifted by an actual amount of shift between the optical axis and the visual line $\Delta$, then $\Delta$ is defined as follows:

$$0.3\ h < \Delta < 1.5\ h$$

where $\theta$ is a most favorable viewing angle of the liquid crystal display relative to the axis of said ocular lens unit;

f is a focal length of the ocular lens unit; and when a diopter is set to be 0, then h is obtained from the equation $$h = f \times \tan \theta.$$

3. The electronic view finder apparatus according to claim 1 wherein said ocular lens unit is a multi-element lens.

4. The electronic view finder apparatus according to claim 3 wherein the diopter of said ocular lens unit may be modified by moving one element of said multi-element lens, that element being that which is closest to the observer.

5. The electronic view finder apparatus according to claim 1 wherein said view finder apparatus is part of a video camera.

* * * * *